(12) United States Patent
Ehlen

(10) Patent No.: US 10,906,768 B2
(45) Date of Patent: *Feb. 2, 2021

(54) CABLE MANAGEMENT SPOOL

(71) Applicant: Facebook, Inc., Menlo Park, CA (US)

(72) Inventor: Jon Brian Ehlen, Newark, CA (US)

(73) Assignee: Facebook, Inc., Menlo Park, CA (US)

( * ) Notice: Subject to any disclaimer, the term of this patent is extended or adjusted under 35 U.S.C. 154(b) by 23 days.

This patent is subject to a terminal disclaimer.

(21) Appl. No.: 16/424,423

(22) Filed: May 28, 2019

(65) Prior Publication Data

US 2019/0276264 A1 Sep. 12, 2019

Related U.S. Application Data

(63) Continuation of application No. 15/647,199, filed on Jul. 11, 2017, now Pat. No. 10,343,870.

(51) Int. Cl.

| | |
|---|---|
| *B65H 75/14* | (2006.01) |
| *B65H 49/36* | (2006.01) |
| *B65H 75/12* | (2006.01) |
| *B65H 75/22* | (2006.01) |
| *B65H 75/44* | (2006.01) |
| *H02G 11/02* | (2006.01) |

(52) U.S. Cl.
CPC ............ *B65H 75/143* (2013.01); *B65H 49/36* (2013.01); *B65H 75/12* (2013.01); *B65H 75/141* (2013.01); *B65H 75/22* (2013.01); *B65H 75/446* (2013.01); *B65H 75/4473* (2013.01); *H02G 11/02* (2013.01); *B65H 2701/32* (2013.01)

(58) Field of Classification Search
CPC .... H02G 11/02; B65H 2701/32; B65H 75/12; B65H 75/141; B65H 75/143
USPC .......................................................... 242/601
See application file for complete search history.

(56) References Cited

U.S. PATENT DOCUMENTS

| | | | |
|---|---|---|---|
| 10,343,870 B2* | 7/2019 | Ehlen ..................... | H02G 11/02 |
| 2012/0039577 A1* | 2/2012 | Kimbrell ................ | B65H 75/36 |
| | | | 385/135 |
| 2013/0183017 A1* | 7/2013 | de los Santos Campos ................ | |
| | | | G02B 6/445 |
| | | | 385/135 |

* cited by examiner

*Primary Examiner* — William E Dondero
(74) *Attorney, Agent, or Firm* — FisherBroyles, LLP

(57) ABSTRACT

Technology is provided for a cable management spool assembly. The cable management spool assembly includes a spool and one or more arcuate covers. The spool includes a flange portion having a first side configured to confront a mounting surface and a second side opposite the first side. A drum portion extends from the second side of the flange portion and one or more latches extend away from the first side of the flange portion. The latches are positioned to engage one or more corresponding mounting features of the mounting surface. The arcuate covers are coupled to the spool and are pivotable between an open position where a cable may be wound on the drum portion and a closed position where the cable is retained on the drum portion.

13 Claims, 6 Drawing Sheets

CABLE MANAGEMENT SPOOL

CROSS REFERENCE TO RELATED APPLICATION

This application is a continuation of U.S. application Ser. No. 15/647,199, filed Jul. 11, 2017.

TECHNICAL FIELD

This patent application generally relates to data storage server configurations, and more specifically, to cable management.

BACKGROUND

Many servers and other computer systems contain components housed in a component rack in sliding drawers, which allows a user to easily access and replace the components. Conventionally, cables are connected to the sliding drawer to provide power and/or communication to components in the drawer. The flexibility of the cables allows the cable to remain connected when the drawer is slid out of the rack. However, the cables must be as long as the desired travel length of the tray. Thus, if access to the entire length of the sliding drawer is desired, the cables must be at least as long as the length of the drawer. This causes the cables to occupy a considerable amount of space when the drawer is fully inside the rack. The use of fiber optic communication cables can reduce the amount of space taken up in the rack because they are thinner and more flexible. However, fiber optic cables can be fragile and have a minimum bend radius below which the cable can be damaged. Accordingly, there is a need to prevent fiber optic cables from being wound too tightly, crimped, or otherwise damaged.

BRIEF DESCRIPTION OF THE DRAWINGS

Embodiments of the cable management spools disclosed herein may be better understood by referring to the following Detailed Description in conjunction with the accompanying drawings, in which like reference numerals indicate identical or functionally similar elements.

Figure 1:
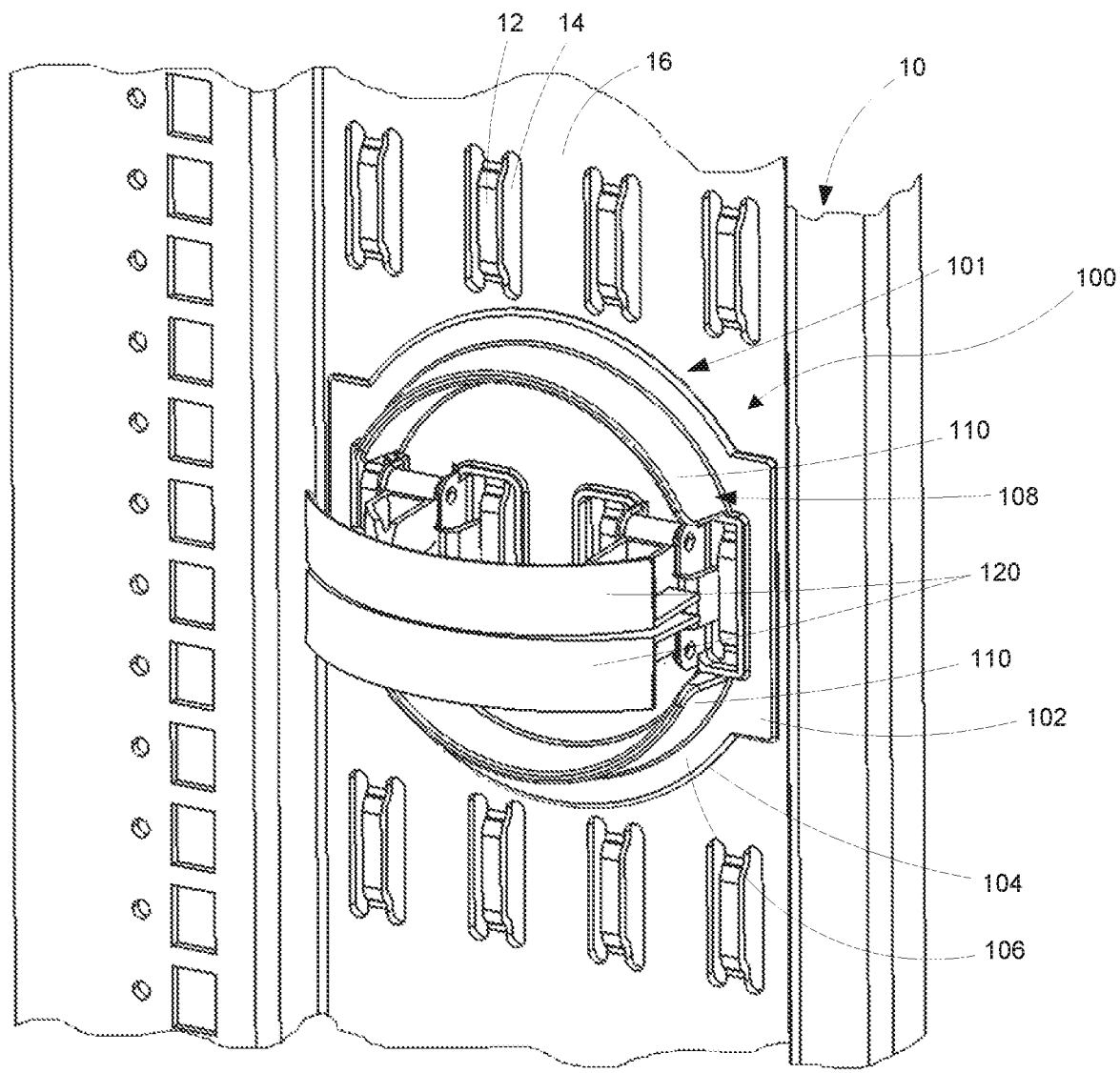
FIG. 1 is an isometric view of a cable management spool assembly according to a representative embodiment.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, equivalents, and alternatives falling within the scope of the embodiments as defined by the appended claims.

DETAILED DESCRIPTION

Overview

Cable management spool assemblies are disclosed. In a representative embodiment, the cable management spool assembly can include a spool and one or more arcuate covers. The spool can include a flange portion having a first side configured to confront a mounting surface and a second side opposite the first side. A drum portion extends from the second side of the flange portion and one or more latches extend away from the first side of the flange portion. In some embodiments, the drum portion comprises two arcuate drum segments. The latches can be positioned to engage one or more corresponding mounting features of the mounting surface. The arcuate covers can be coupled to the spool and are pivotable between an open position where a cable may be wound on the drum portion and a closed position where the cable is retained on the drum portion.

In some embodiments, the arcuate covers can include a pair of mounting knuckles and the spool can include a pair of clevises each positioned to receive a corresponding one of the mounting knuckles for rotation therein. In some embodiments, the spool assembly includes one or more resilient members, such as an extension spring, connected between the arcuate covers and the spool to selectively retain the one or more arcuate covers in both the open position or the closed position.

General Description

Various examples of the devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

FIG. 1 shows a cable management spool assembly 100, according to a representative embodiment, mounted to a mounting surface 16 of a component rack 10. The spool assembly 100 attaches to mounting features on the rack 10, such as bridge lances 12. A bridge lance is a typical mounting feature found in component racks and comprises a strip of material 12 formed between two slots 14 which is deformed away from the surface 16 of the material. As will be explained more fully below, the spool assembly 100 can include features designed to engage these or other mounting feature configurations.

The spool assembly 100 includes a spool 101 having a flange portion 102 and a drum portion 108. The flange portion 102 has a first side 104 configured to confront the mounting surface 16 and a second side 106 opposite the first side 104. The drum portion 108 extends from the second side 106 of the flange portion 102 and can include two arcuate or semi-circular drum segments 110, for example. The drum portions 108 are configured to allow data communication cables, such as fiber optic cables, to be wound around the drum portions' radially facing outer surface. The drum portions 108 are configured so the outer radius is large enough to ensure that the bend of the fiber optic cable will not be below the cable's minimum bend radius. In some embodiments, the radius of the drum segments 110 can be approximately 60 mm, providing an overall diameter of approximately 120 mm, which is suitable for winding typical fiber optic cables. Thus, the disclosed spool assembly 100 can help prevent fiber optic cables from being wound too tightly, crimped, or otherwise damaged. One or more arcuate covers 120 are coupled to the spool 101. The covers 120 are pivotable between an open position (FIG. 1) where a cable, e.g., fiber optic cable, (not shown) may be wound on the drum portion 101 and a closed position (FIG. 2) where the cable is retained on the drum portion 101. The disclosed spool assembly 100 consolidates and protects fiber optic cables in a small storage area. The disclosed spool assembly 100 also facilitates access to components within a drawer. For example, a user can slide a drawer in, open the covers 120, and wind loose cable around the drum portions 108. When pulling the drawer out, the user can access the spool assembly 100 by opening the covers 120 and unwinding the desired length of cable to allow the drawer to move out to its extended position for maintenance or other servicing.

Figure 2:
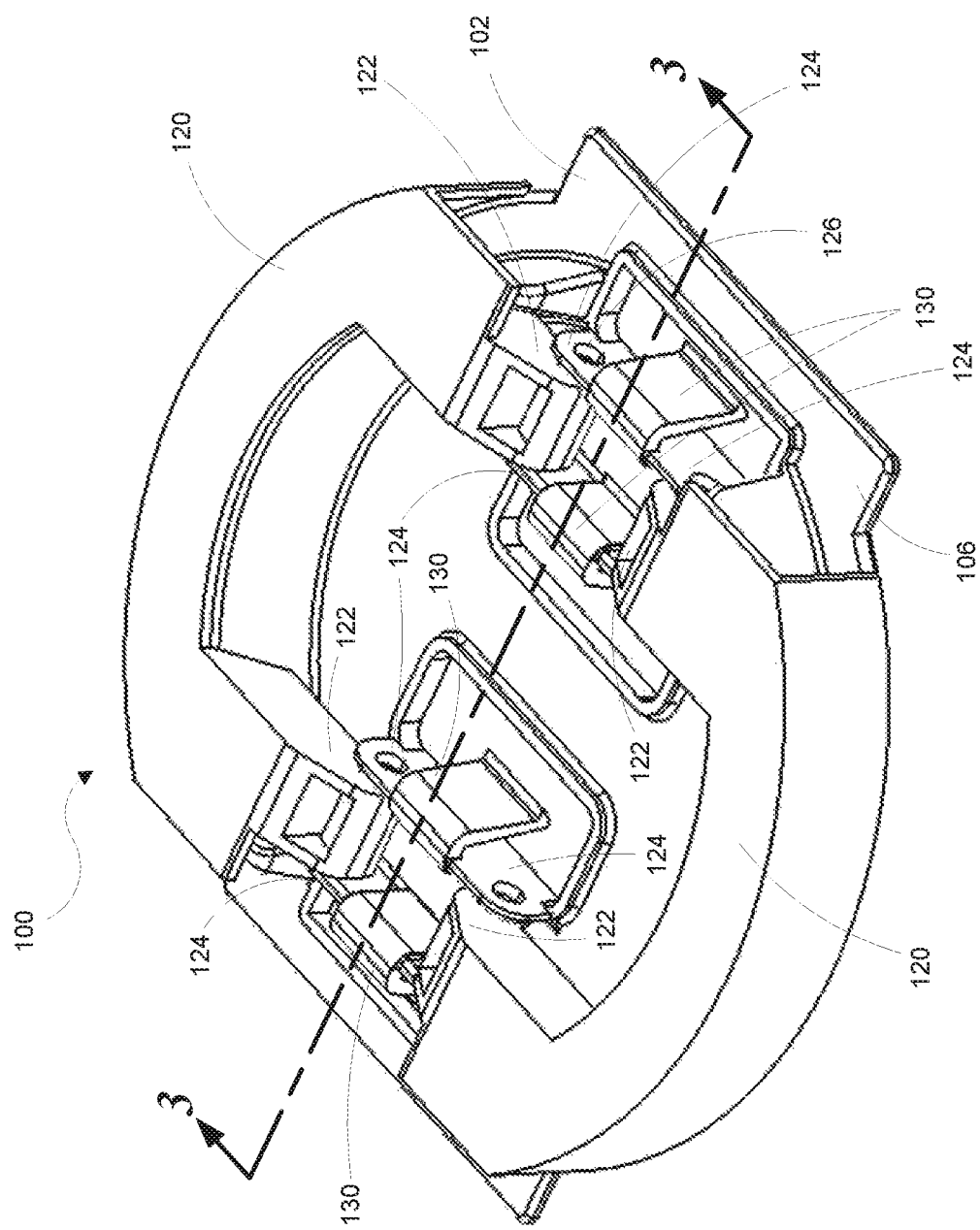
FIG. 2 is an isometric view of the cable management spool assembly of FIG. 1 shown in a closed configuration.

With reference to FIG. 2, there are two pairs of clevises 124 positioned on the second side 106 of the flange portion 102 and each cover 120 includes a pair of mounting knuckles 122 coupled to a corresponding one of the two pairs of clevises 124. In some embodiments, the covers 120 are coupled to the clevises 124 with suitable dowels or pins 126 so that each cover can independently pivot at the mounting knuckle about the dowel or pin and move between the open and closed positions.

Figure 3:
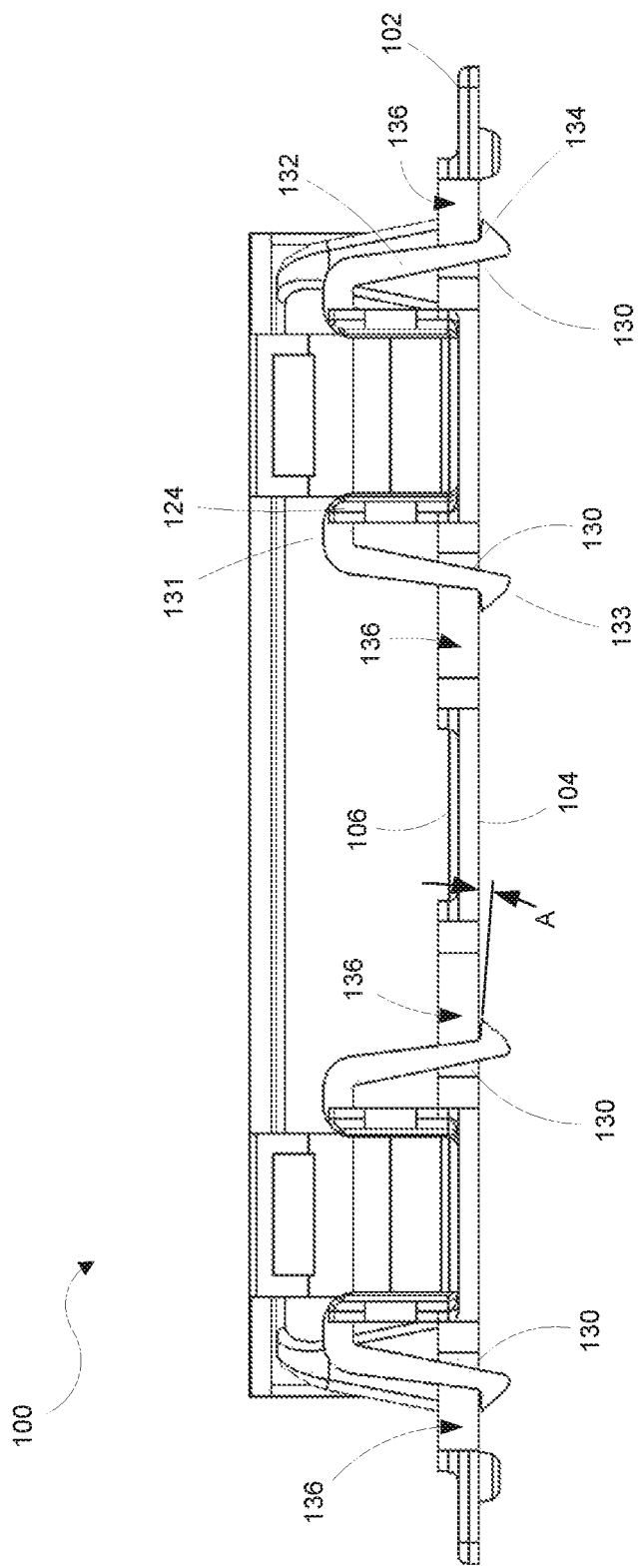
FIG. 3 is a cross-section of the cable management spool assembly taken about line 3-3 in FIG. 2.
Figure 4:
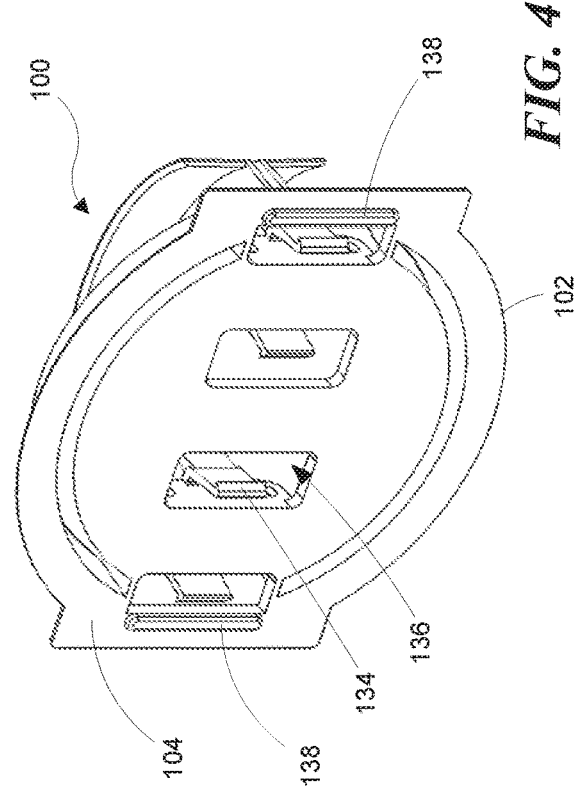
FIG. 4 is an isometric view of the cable management spool assembly of FIGS. 1 and 2 as viewed from an attachment surface.
Figure 5:
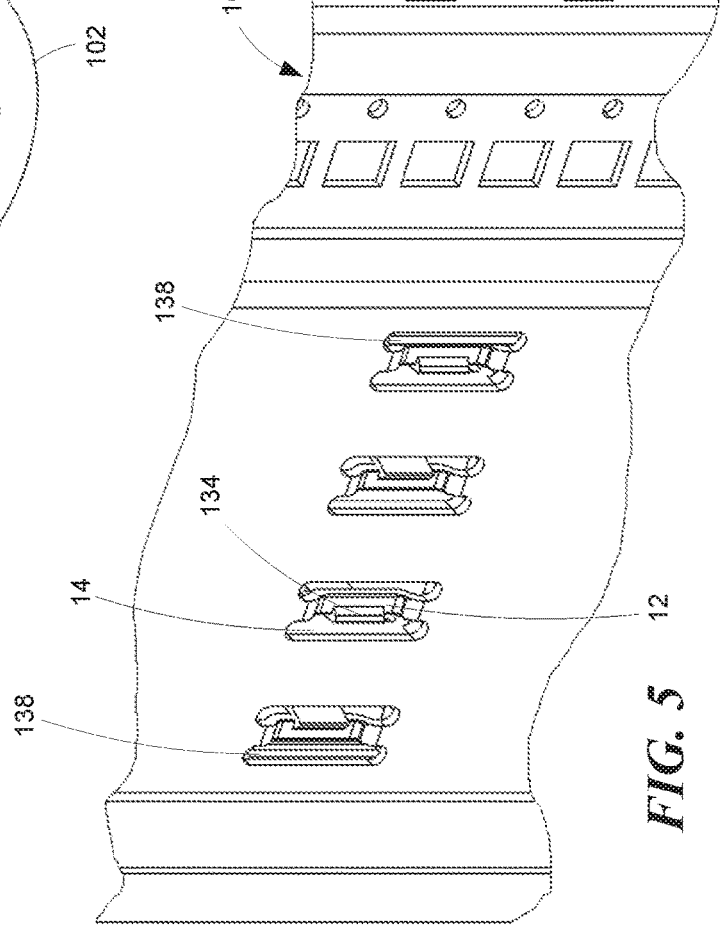
FIG. 5 is a an isometric view of the cable management spool assembly shown in FIG. 4 attached to a rack.

The spool assembly 100 is attached to the mounting surface 16 with four latches 130 configured to engage corresponding bridge lances 12 (FIG. 1). In other embodiments, the spool assembly 100 can be attached to a mounting surface with suitable fasteners or mating hook and loop material, for example and without limitation. As shown in FIG. 3, each latch 130 includes a deflectable latch arm 132 having a proximal end portion 131 attached to at least one of the clevises 124 and a latch barb 134 disposed on a distal end portion 133 positioned to engage a corresponding rack mounting feature. In some embodiments, the latch barbs 134 can be angled (angle A) in order to take up any tolerance in the mounting feature. For example, the latch barbs 134 can be angled approximately 5-10 degrees to accommodate ±0.5 mm of tolerance in the mounting features. Each latch arm 132 extends through an associated mounting aperture 136 formed through the flange portion 102. With further reference to FIGS. 4 and 5, the mounting apertures 136 are each sized and configured to receive a corresponding bridge lance 12 thereby locating the latch barb 134 in position to engage the back side of the bridge lance 12. In some embodiments, the flange portion 102 can include a pair of alignment bosses 138 positioned on the first side 104 to fit in corresponding slots 14. The bosses 138 help position the flange portion 102, such that the latch barbs 134 are substantially centered on the bridge lances 12.

Figure 6:
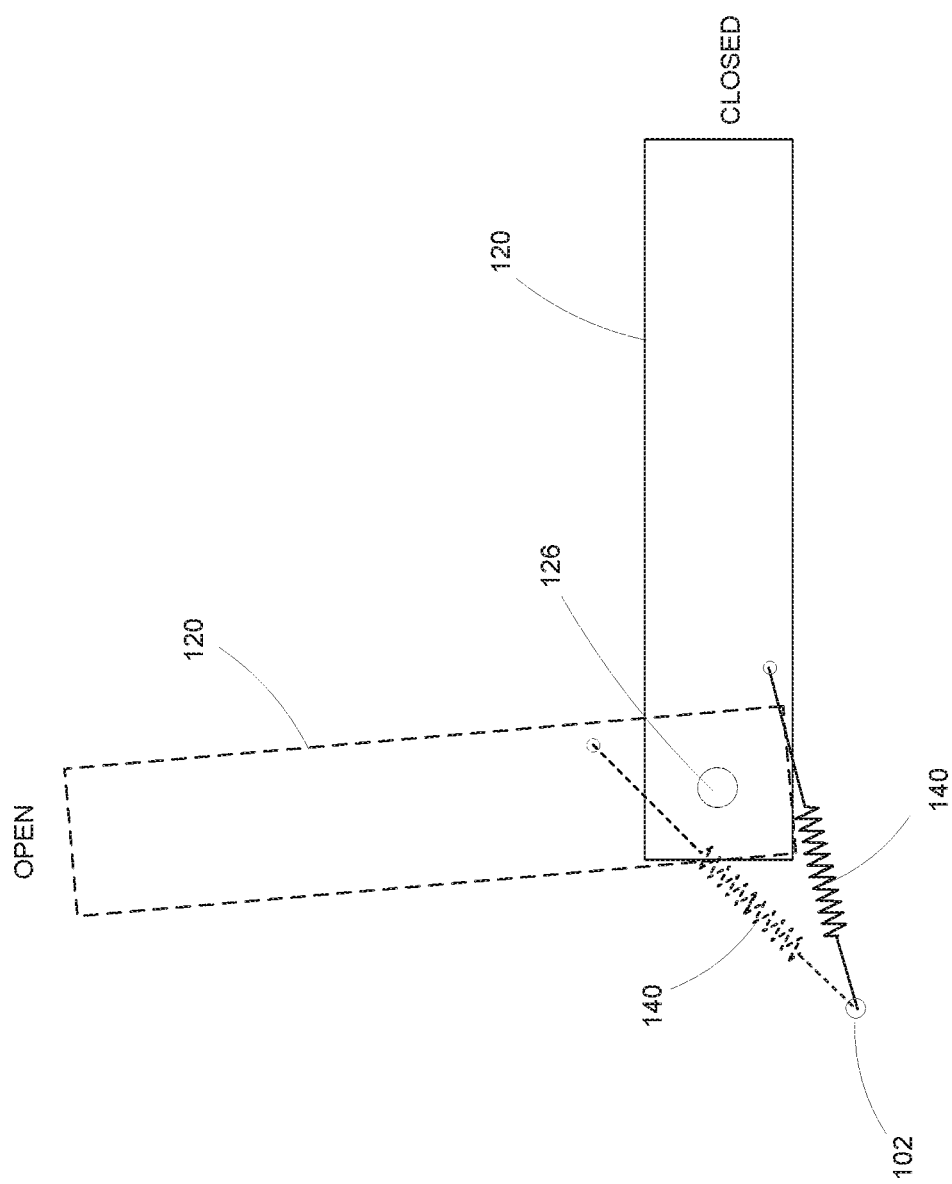
FIG. 6 is a schematic side view of a representative spool cover and return spring.

As shown schematically in FIG. 6, a resilient member, such as an extension spring 140, can be connected between each arcuate cover 120 and the flange portion 102. The extension spring 140 can be connected between the arcuate cover 120 and the flange portion 102 in an over-center configuration to selectively retain the cover 120 in both the open position or the closed position. For example, in the closed position, the extension spring 140 extends to one side of the pin 126 to pull the cover 120 toward the closed position. When the cover 120 is moved toward the open position, the spring 140 crosses over the center (i.e., over-center) of the pin 126 to pull the cover 120 toward the open position. Thus, the extension spring 140 is capable of holding the cover 120 in both the open and closed positions.

Figure 7:
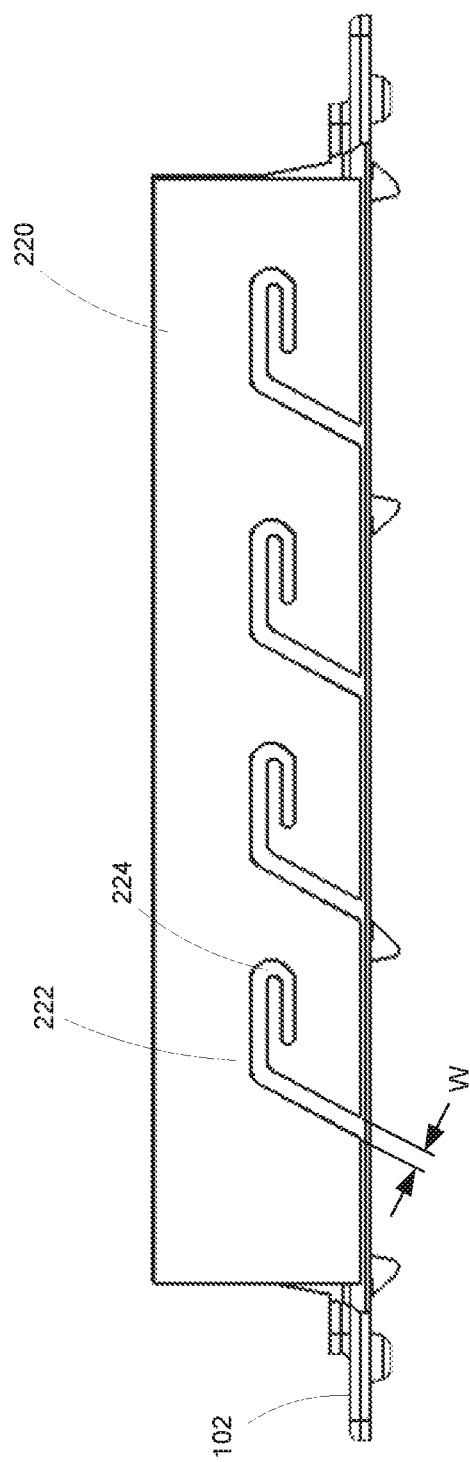
FIG. 7 is a front view of a spool cover according to a representative embodiment.

FIG. 7 illustrates an arcuate cover 220 according to another representative embodiment. The cover 220 is constructed and mounted to the flange portion 102 in a similar manner to that described above for cover 120. The arcuate cover 220, however, includes a plurality of cable exit slots 222. In some embodiments, the slots 222 can include a hook portion 224, as shown. The cable exit slots 222 are arranged on the cover 120 to provide various locations for a cable to exit the spool. The hook portion 224 gently captures the cables and helps retain the cables in position for transport and handling. In some embodiments, the width W of the cable slots 222 can be between about 2.0 mm and about 3.5 mm to accommodate a typical fiber optic cable.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A cable management spool assembly, comprising:
a spool, including:
a flange portion having a first side configured to confront a mounting surface and a second side opposite the first side;
a drum portion extending from the second side of the flange portion; and
one or more latches extending away from the first side of the flange portion and positioned to engage one or more corresponding mounting features of the mounting surface; and
one or more arcuate covers coupled to the spool and pivotable between an open position where a cable may be wound on the drum portion and a closed position where the cable is retained on the drum portion, wherein the one or more arcuate covers each include a plurality of cable exit slots.

2. The cable management spool assembly of claim 1, wherein the drum portion comprises two arcuate drum segments.

3. The cable management spool assembly of claim 2, wherein the one or more arcuate covers includes a pair of mounting knuckles and the spool includes a pair of clevises each positioned to receive a corresponding one of the mounting knuckles for rotation therein.

4. The cable management spool assembly of claim 1, further comprising a resilient member connected between the one or more arcuate covers and the spool to selectively retain the one or more arcuate covers in both the open position or the closed position, wherein the resilient member is an extension spring.

5. The cable management spool assembly of claim 1, wherein each latch includes a deflectable latch arm having a proximal end portion attached to the second side of the flange portion and a latch barb disposed on a distal end portion.

6. The cable management spool assembly of claim 5, wherein the latch arm extends through a mounting aperture formed through the flange portion.

7. A cable management spool assembly, comprising:
a spool, including:
a flange portion having a first side configured to confront a mounting surface and a second side opposite the first side;
at least two arcuate drum segments extending from the second side of the flange portion;
at least two deflectable latch arms each having a proximal end portion attached to the second side of the flange portion and a latch barb disposed on a distal end portion positioned to engage a corresponding mounting feature of the mounting surface, wherein each latch arm extends through an associated mounting aperture formed through the flange portion; and
one or more arcuate covers coupled to the spool and pivotable between an open position where a cable may be wound on the drum portion and a closed position where the cable is retained on the drum portion, wherein the one or more arcuate covers each include a plurality of cable exit slots.

8. The cable management spool assembly of claim 7, wherein the one or more arcuate covers includes a pair of mounting knuckles and the spool includes a pair of clevises each positioned to receive a corresponding one of the mounting knuckles for rotation therein.

9. The cable management spool assembly of claim 8, further comprising a resilient member connected between the one or more arcuate covers and the spool to selectively retain the one or more arcuate covers in both the open position or the closed position.

10. The cable management spool assembly of claim 9, wherein the resilient member is an extension spring.

11. A cable management spool assembly, comprising:
a spool, including:
a flange portion having a first side configured to confront a mounting surface and a second side opposite the first side;
two arcuate drum segments extending from the second side of the flange portion;
two pairs of clevises positioned on the second side of the flange portion; and
four deflectable latch arms each having a proximal end portion attached to the spool and a latch barb disposed on a distal end portion positioned to engage a corresponding mounting feature of the mounting surface; and
two arcuate covers each including a pair of mounting knuckles coupled to a corresponding one of the two pairs of clevises, and pivotable between an open position where a cable may be wound on the drum portion and a closed position where the cable is retained on the drum portion, wherein the one or more arcuate covers each include a plurality of cable exit slots.

12. The cable management spool assembly of claim 11, further comprising a resilient member connected between each of the two arcuate covers and the spool to selectively retain each arcuate cover in both the open position or the closed position.

13. The cable management spool assembly of claim 12, wherein the resilient member is an extension spring.

* * * * *